US009973229B2

(12) United States Patent
Rana (10) Patent No.: US 9,973,229 B2
(45) Date of Patent: May 15, 2018

(54) PORTFOLIO CASE FOR USE WITH TABLET COMPUTER

(71) Applicant: Kapil Rana, London (GB)

(72) Inventor: Kapil Rana, London (GB)

( * ) Notice: Subject to any disclaimer, the term of this patent is extended or adjusted under 35 U.S.C. 154(b) by 0 days. days.

(21) Appl. No.: 15/293,277

(22) Filed: Oct. 14, 2016

(65) Prior Publication Data

US 2018/0109279 A1   Apr. 19, 2018

(51) Int. Cl.
*H04M 1/00* (2006.01)
*H04B 1/3877* (2015.01)
*A45C 11/00* (2006.01)
*A45C 13/10* (2006.01)
*A45C 13/00* (2006.01)
*H04B 1/3883* (2015.01)
*H02J 7/00* (2006.01)

(52) U.S. Cl.
CPC .......... *H04B 1/3877* (2013.01); *A45C 11/00* (2013.01); *A45C 13/005* (2013.01); *A45C 13/103* (2013.01); *H02J 7/0052* (2013.01); *H04B 1/3883* (2013.01); *A45C 2011/003* (2013.01); *H02J 2007/0062* (2013.01)

(58) Field of Classification Search
None
See application file for complete search history.

(56) References Cited

U.S. PATENT DOCUMENTS

| 5,629,832 A | 5/1997 | Sellers | |
| 7,479,902 B2 * | 1/2009 | Wang | G06F 1/1632 341/22 |
| 8,472,186 B2 * | 6/2013 | Probst | G06F 1/1616 345/168 |
| 8,479,915 B2 * | 7/2013 | Chen | G06F 1/1626 206/320 |
| 8,763,795 B1 * | 7/2014 | Oten | A45C 11/00 206/320 |
| 2004/0144665 A1 | 7/2004 | Hartstein | |
| 2007/0203963 A1 * | 8/2007 | Chen | G06F 1/1662 708/100 |
| 2008/0007214 A1 | 1/2008 | Cheng | |
| 2011/0006725 A1 | 1/2011 | Wilson | |
| 2011/0222238 A1 * | 9/2011 | Staats | G06F 1/1632 361/679.55 |

(Continued)

FOREIGN PATENT DOCUMENTS

| CN | 201663998 | 8/2010 |
| CN | 203502876 U | 3/2014 |

(Continued)

*Primary Examiner* — Tuan A Tran
(74) *Attorney, Agent, or Firm* — Crose Law LLC; Bradley D. Crose (57) ABSTRACT

Tablet computers are increasing in popularity due to their versatility and portability. However, despite the ease with which such touch-screen devices may be operated in certain circumstances, there are situations in which a conventional desktop computer and/or laptop computer are preferred. The present invention provides a portfolio case in which a tablet may be secured to an inside surface of the lid for operable connection to a fold-out keyboard and power pack retained within the case. In this way, a tablet computer may achieve all the functionality of a laptop computer, while retaining the versatility of a tablet.

2 Claims, 5 Drawing Sheets

(56) References Cited

U.S. PATENT DOCUMENTS

| | | |
|---|---|---|
| 2011/0287726 A1 | 11/2011 | Huang |
| 2013/0106353 A1 | 5/2013 | Foster |
| 2014/0041772 A1 | 2/2014 | Hayes |

FOREIGN PATENT DOCUMENTS

| | | |
|---|---|---|
| FR | 2652243 | 8/1989 |
| GB | 2311057 | 9/1997 |
| GB | 2488764 A | 9/2012 |
| GB | 2501354 A | 10/2013 |
| GB | 2524963 A | 10/2015 |
| WO | 2013021781 A1 | 2/2013 |
| WO | 2013105898 A1 | 7/2013 |

\* cited by examiner

PORTFOLIO CASE FOR USE WITH TABLET COMPUTER

FIELD OF THE INVENTION

The present invention relates generally to a portfolio case and finds particular utility with storage of tablet computers.

BACKGROUND OF THE INVENTION

Tablet computers, together with similar devices such as smartphones, phablets, game consoles, are increasing in popularity due to their versatility and portability. However, despite the ease with which such touch-screen devices may be operated in certain circumstances, there are situations in which a conventional desktop computer and/or laptop computer are preferred. For example, when tactile feedback necessary for touch-typing is required, where data input without obscuring the screen is desired, or where other functionality is required that goes beyond the physical features of the tablet. In such circumstances, particularly where a user is in a remote environment, a user will often carry with them a laptop computer in addition to a tablet, or may carry various peripheral devices, which may be cumbersome and/or poorly organised.

For example, these devices have a limited operational period on a single charge of their battery, and thus recharging is required at frequent intervals. This is often achieved by connecting the mobile computer device to a supply of mains electricity; however, various power packs are also available on the market for storing relatively large quantities of energy.

These power packs may be connected to a mobile computer device to recharge them after their internal battery power is depleted, or may be used to maintain a mobile computer device's battery at a predetermined level. The power pack, instead of the mobile computer device, may be charged by connecting it to mains electricity, and the mobile device may be charged from the power pack.

BRIEF SUMMARY OF THE INVENTION

According to a first aspect of the present invention, there is provided a portfolio case, comprising: a substantially rigid open-top box; a substantially rigid lid, pivotally coupled to the box by a hinge; a tablet retention mechanism located on an inside surface of the lid; wherein the hinge is configured to hold the lid in at least one rotational orientations relative to the box selected from a fully open position in which the tablet is operable by a user, and a partially open position, partway between the fully open position and a closed position in which operation of the tablet by a user is substantially inhibited; a fold-out keyboard pivotally attached to the box, the keyboard configured to be operably connectable to the tablet; and a power pack retained within the box configured to supply power to the keyboard and the tablet. In this way, a tablet computer may achieve all the functionality of a laptop computer, while retaining the versatility of a tablet.

The portfolio case may be a briefcase and/or an attaché case. The box may be made from plastic material, metal, polycarbonate, fibre composite material, or any other suitable substantially rigid material. The lid may be made from the same, similar or different material to the box.

The tablet retention mechanism may comprise a plurality of straps, for instance 2, 3 or 4 straps. The straps may be elasticated and/or resilient. The straps may be substantially transparent. For instance, the straps may comprise a transparent plastics material.

The hinge may comprise a friction hinge; that is, the hinge may resist pivotal motion of the lid with respect to the box sufficient to maintain the lid in a fixed position relative to the box (i.e. the friction of the hinge balances the weight of the lid and a tablet retained on the lid). Optionally, the friction of the hinge may balance the weight of the box.

In alternative arrangements, the hinge may comprise a ratchet.

The keyboard may be movable between a first position in which it is retained within the box and a second position in which it extends out of the box away from the lid. In particular, the keyboard and box may be sized such that in the second position the keyboard slopes from the open top of the box toward a surface onto which the box is placed. In this way, the keyboard may be usable at a desired angle for comfort.

The case may further comprise at least one accessory component, such as a loud speaker and/or connector, for example an audio jack, network socket, USB port, or any other suitable port, the and which may be configured to be operably connectable to the tablet.

Operable connection with the tablet may be by any suitable means such as by wired connection and/or Bluetooth®.

The case may further comprise a processor configured to control signals between the tablet and the keyboard and/or the accessory component.

Supply of power to the tablet by the power pack may be by any suitable means such as by wired connection and/or inductive link. For example, an induction unit may be physically connected to an input port of the tablet, and the induction unit may receive power via induction from the power pack.

The power pack may be provided with a mains feed cable, such that the power-pack may be recharged by connection to a mains power supply.

The case may comprise at least one power indicator, for instance a light (e.g. an LED light), on an exterior of the box and/or lid, and/or on an interior of the box and/or lid.

The case may further comprise at least one cable tidy, configured to retain at least one of the wired connectors. The cable-tidy may be a winding, sleeve, or other suitable cable-tidy.

The case may further comprise a wireless communication device, for instance able to communicate using Bluetooth®, Near-Field Communication (NFC), Ultra-Wide Band (UWB), Wifi, and/or any other wireless communication technology, which may be configured to create and/or host a Wireless Local Area Network (WLAN) and/or a Personal Area Network (PAN).

The case may be configured such that the power pack, processor, wireless communication device, and/or other electronic components are contained within a sealed portion of the case. In this way, accidental interaction with hardware components is prevented.

The case may comprise a storage region accessible via the lid, in which may be stored the fold-out keyboard and/or any other items that a user desires, such as a stylus, stationary, notepad, etc.

The case may further comprise a pocket on a base of the box opposite the lid. In particular, the pocket may comprise a recess in the base of the box and/or a hinged pocket lid. The pocket may be sized to receive a pad of A4 paper therein.

The case may be provided with carrying members, for example at least one handle and/or at least one shoulder strap.

The case may comprise a closure, such as a lock, buckle, catch, zip closures, hook and loop closure, flap, popper/press-stud, button and button-hole/loop arrangement and/or any other form of closure. For instance the lid and/or pocket lid may be water resistant by being sealable with a zip closure.

The power pack may be conveniently stored in the same case as tablet and/or a mobile computer device, while at the same time being both accessible for transferring electrical power to the mobile computer device and in a manner that prevents damage to the mobile computer device due to contact with the power pack.

The case may comprise a substantially rigid shell. The shell may be a plastics material, polycarbonate material, a composite material, or any other suitable material. The case may comprise a flexible textile and/or woven material. The case may comprise layers of flexible textile and/or woven material over a shell layer.

In some embodiments, the power pack may be removably receivable in the case. Alternatively, the power pack may be built-in to the case.

In some arrangements, a charging cable may be removably receivable in the case. Alternatively, the charging cable may be built-in to the case and/or the passage.

The case may comprise a charging cable within the box. The charge cable may be a USB cable. The case may comprise a plurality of charge cables for use with a corresponding variety of charge connections on a mobile computer device. Alternatively or additionally, the charge cable may comprise a split cable that is configure to connect to a plurality of charge connections on a mobile computer device.

The power pack may comprise a battery having substantially any suitable charge, for example a charge of between approximately 3000 mAh and 20000 mAh; in particular a charge of approximately 5000 mAh, 7500 mAh, 10,000 mAh or 15000 mAh. The power pack may connect to the charge cable via a USB port.

'Operable' may mean substantial operation of a device to perform its primary function. It is accepted that certain functions of most mobile computer devices may be permitted when inside a case (such as controlling volume while music is being played by the device); however, effective access a touch-screen of a mobile computer device (i.e. the primary user interface) requires a user to be able to view a substantial part of the screen. Similarly, 'substantially inhibited' operation of the device includes preventing a user from being able to execute the device's primary function and/or being unable to effectively use the device's primary user interface. The closed position may include, for instance, a position in which the mobile computer device cannot be viewed by a user.

The securing mechanism may be a zip around at least a portion of a perimeter of the lid/enclosing wall (for instance, substantially along three sides of a rectangular enclosing wall); however, other forms of closing the case are also envisaged, such as a hook and loop closure, buttons, poppers/press-studs, etc. The zip may be stitched on reversed, thereby hiding it from view. Nevertheless, the pull tag may be located on the outside of the zip.

The case may comprise a gusset between the retaining and enclosing walls such that, it may be fold back on itself; that is, it can be folded from the closed position by more than 180 degrees, more than 270 degrees and/or substantially 360 degrees. In this way, the mobile computer device may be at the front, with the retaining and enclosing walls of the case behind it.

The power pack could be charged from mains electricity, a car battery, solar panels and/or any other suitable power supply via the power cable.

The case may further comprise at least one loudspeaker embedded in at least one of the retaining or enclosing walls, the at least one loudspeaker for connection to the mobile computer device therein.

The case may further comprise an audio cable for connection to an audio-out socket of the mobile computer device. The audio cable may pass through a further passage in the case between the loudspeaker and the first pocket.

The speaker(s) may be passive speakers (i.e. driven by the jack output power) or active speakers (i.e. connected to and powered by the power pack). The speakers may be built into the enclosing wall and/or the retaining wall, and may be adjacent to the hinge between the enclosing wall and/or the retaining wall.

The case may further comprise at least one cable tidy configured to receive a free end of a cable therein. For instance, there may be one cable tidy for a charging cable, one cable tidy for an audio cable, and/or one cable tidy for a power cable. Alternatively, more than one cable may be received within the or each cable tidy. The cable tidy may be in the form of a textile material tube, which may be flexible and/or stretchable. Alternatively or additionally, the cable tidy may comprise a strip of elastic. The cable tidy may be adjacent to the passage and/or passages.

The retaining mechanism may be any arrangement of components for holding a mobile computer device against the retaining wall, such as clamps and/or clips. The retaining mechanism comprises a plurality of straps. There may be two, four or eight straps. In particular, there may be one set of two straps, one set of four straps, two sets of two straps or two sets of four straps. Each set of straps may be configured for use with a different size of mobile computer device. For instance, a first set of straps may be configured to hold a tablet computer having a diagonal size of approximately 13 cm, 18 cm, 20 cm or 25 cm, the second set of straps may be configured to hold a tablet computer having a diagonal size of approximately 28 cm, 20 cm, 25 cm or 34 cm. Each set of straps may be configured to hold a range of sized of mobile computer device, for instance over a range of between 1 cm to 3 cm, in particular 2 cm.

The straps may be configured to pass around the corners of a mobile computer device, or around the edge of a mobile computer device, located in the case.

The straps may be elasticated. In this way, the straps may stretch around the corners and/or edges of a mobile computer device therein, to hold it in place.

The straps may be substantially transparent. For instance, the straps may be clear silicone bands, which may be mounted to a polypropylene sheet that may be sewn between textile layers on the retaining wall. In alternative embodiments, the straps may be made of elasticated webbing and/or other elasticated bands.

The case may be provided with a strap, which may be releasably attached. In particular, the strap may be configured to hook onto metal loops and/or eyes/eyelets on the case. The metal loops may be stitched into a seam on the case. The straps may hook onto the metal loops using a clip, which may be made from a plastics material and/or metal. The strap may be adjustable in length. The strap may be a shoulder strap. The strap may have a padded section. In alternative embodiments, sewn material holes could be used instead of metal eyelets at the attachment points for the strap.

BRIEF DESCRIPTION OF THE DRAWINGS

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

DETAILED DESCRIPTION OF THE INVENTION

The present invention will be described with respect to certain drawings but the invention is not limited thereto but only by the claims. The drawings described are only schematic and are non-limiting. Each drawing may not include all of the features of the invention and therefore should not necessarily be considered to be an embodiment of the invention. In the drawings, the size of some of the elements may be exaggerated and not drawn to scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that operation is capable in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that operation is capable in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Similarly, it is to be noticed that the term "connected", used in the description, should not be interpreted as being restricted to direct connections only. Thus, the scope of the expression "a device A connected to a device B" should not be limited to devices or systems wherein an output of device A is directly connected to an input of device B. It means that there exists a path between an output of A and an input of B which may be a path including other devices or means. "Connected" may mean that two or more elements are either in direct physical or electrical contact, or that two or more elements are not in direct contact with each other but yet still co-operate or interact with each other.

Reference throughout this specification to "an embodiment" or "an aspect" means that a particular feature, structure or characteristic described in connection with the embodiment or aspect is included in at least one embodiment or aspect of the present invention. Thus, appearances of the phrases "in one embodiment", "in an embodiment", or "in an aspect" in various places throughout this specification are not necessarily all referring to the same embodiment or aspect, but may refer to different embodiments or aspects. Furthermore, the particular features, structures or characteristics of any embodiment or aspect of the invention may be combined in any suitable manner, as would be apparent to one of ordinary skill in the art from this disclosure, in one or more embodiments or aspects.

Similarly, it should be appreciated that in the description various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Moreover, the description of any individual drawing or aspect should not necessarily be considered to be an embodiment of the invention. Rather, as the following claims reflect, inventive aspects lie in fewer than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some features included in other embodiments, combinations of features of different embodiments are meant to be within the scope of the invention, and form yet further embodiments, as will be understood by those skilled in the art. For example, in the following claims, any of the claimed embodiments can be used in any combination.

In the description provided herein, numerous specific details are set forth. However, it is understood that embodiments of the invention may be practised without these specific details. In other instances, well-known methods, structures and techniques have not been shown in detail in order not to obscure an understanding of this description.

In the discussion of the invention, unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

The use of the term "at least one" may mean only one in certain circumstances.

The principles of the invention will now be described by a detailed description of at least one drawing relating to exemplary features of the invention. It is clear that other arrangements can be configured according to the knowledge of persons skilled in the art without departing from the underlying concept or technical teaching of the invention, the invention being limited only by the terms of the appended claims.

Figure 1:
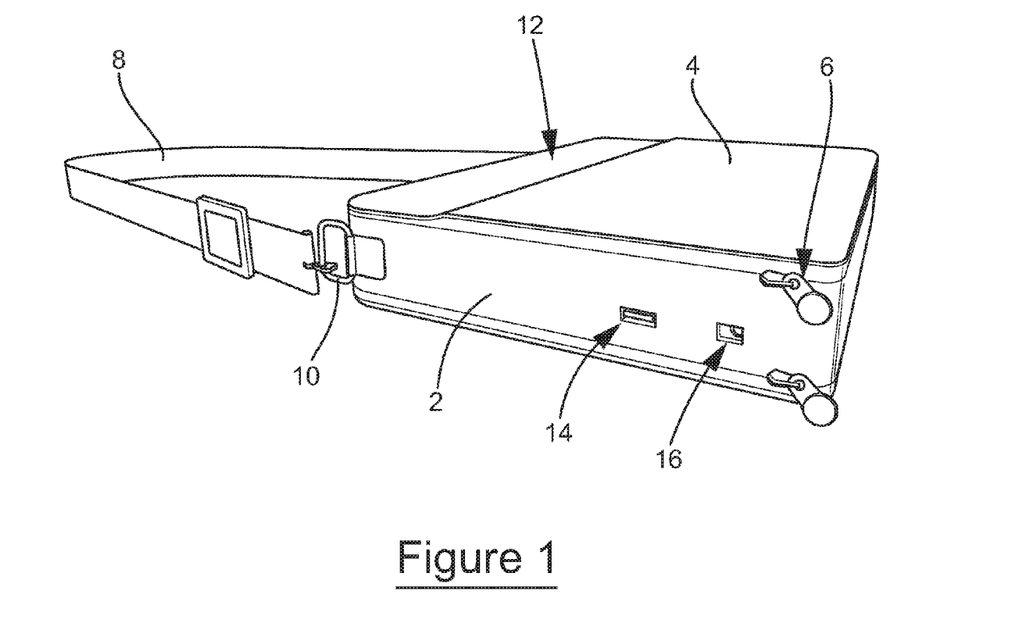
FIG. 1 is perspective view of a case according to the present invention, shown closed.

FIG. 1 is perspective view of a case according to the present invention, shown closed. The case includes an open-top box 2 with a lid 4 that may be secured closed with a zipper 6. An optional adjustable strap 8 is provided for attachment to the box 2 as shown via rings 10 permanently attached to the box 2. An LED light 12 is located on an exterior of the lid 4 for indicating a level of charge of a power pack and/or a tablet computer within the case. On a side of the box 2 is shown a USB socket 14 and an audio jack 16 suitable for connection of peripheral devices thereto.

Figure 2:
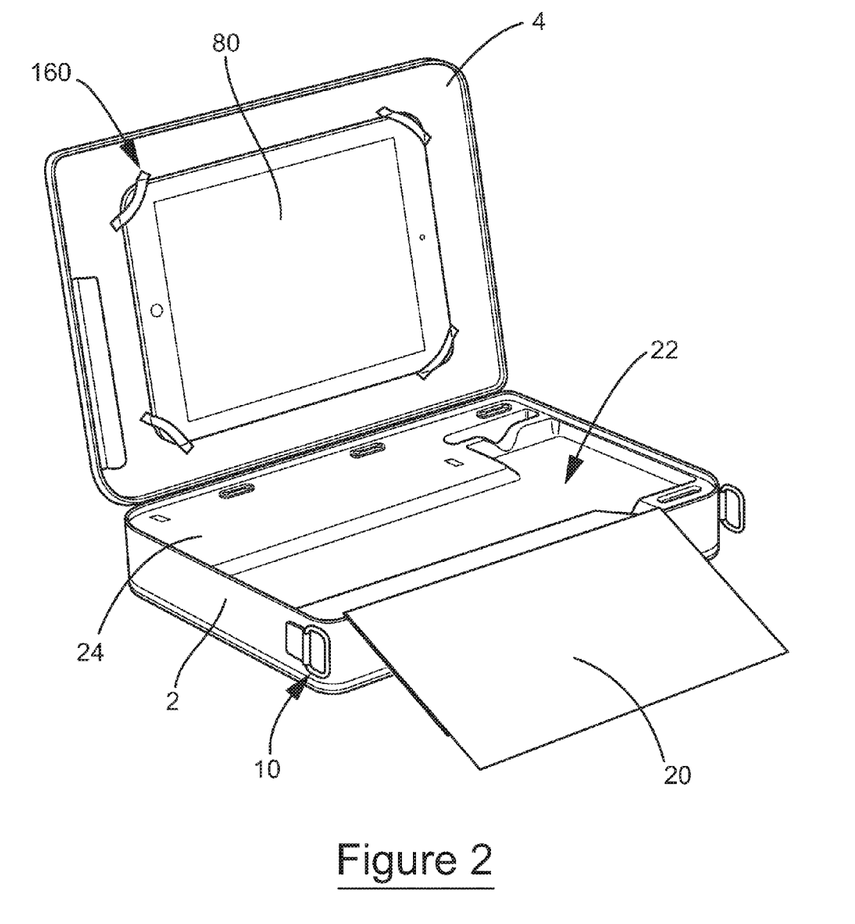
FIG. 2 is a perspective view of the case of FIG. 1, shown open.

FIG. 2 is a perspective view of the case of FIG. 1, shown with the lid 4 open and a tablet computer 80 held on an interior surface of the lid 4 by straps 160. The strap 8 has been detached from the rings 10, for clarity.

A fold-out keyboard 20 is provided hingably coupled to the box opposite the lid 4 such that, when folded out (as shown) a user may manipulate the keys thereon. When the keyboard 20 is folded back, it is received within a recess 22 in the box 2. Also provided within the box is a power pack 24, which may be visible or may be covered by an internal casing.

Figure 3:
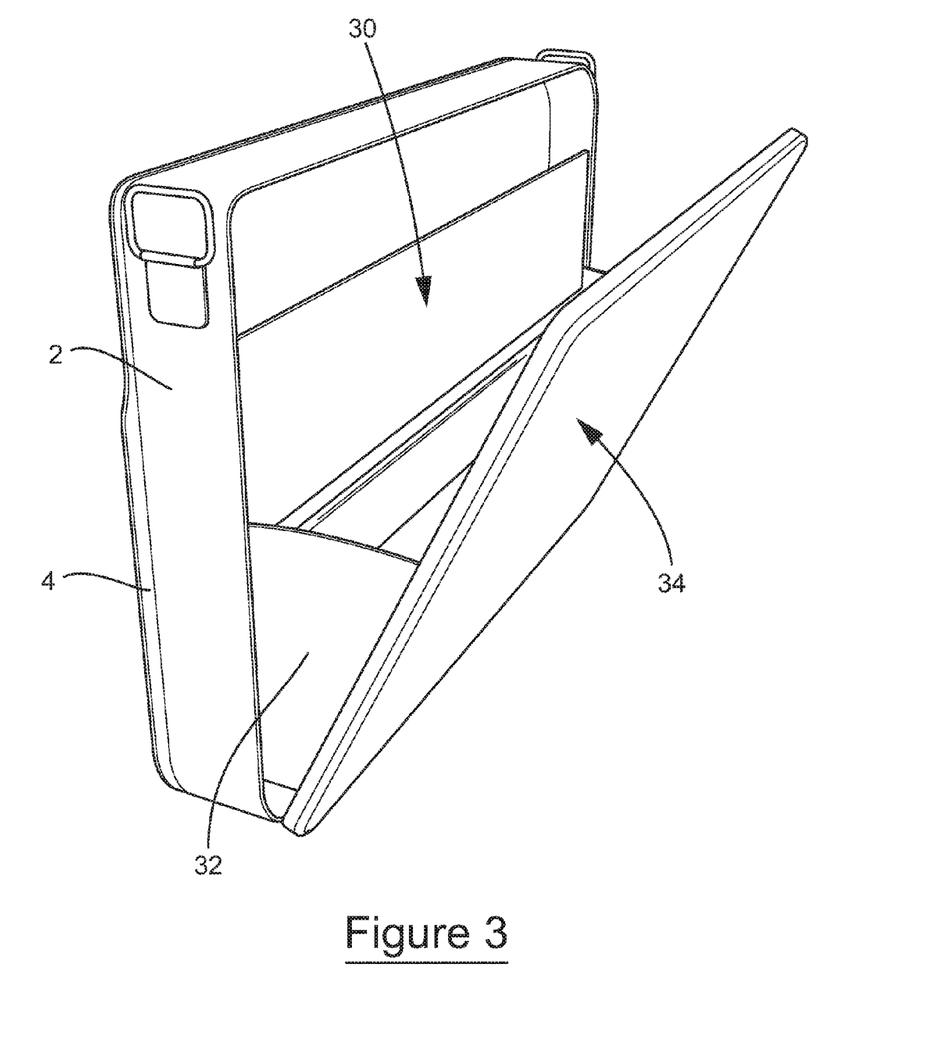
FIG. 3 is a perspective view of the case of FIG. 1 with an optional storage compartment shown open.

FIG. 3 is a perspective view of the case of FIG. 1 with an optional storage compartment 30 shown open. The storage compartment 30 is hingably openable at the same side of the box 2 as the lid 4, and may be provided with a guide and/or stop 32 to limit the opening of the storage compartment lid 34 and/or to prevent accidental loss of items laterally from the storage compartment 30. The storage compartment 30 may also be securable in a closed position by means of a zip around a periphery of the lid 34.

Figure 4:
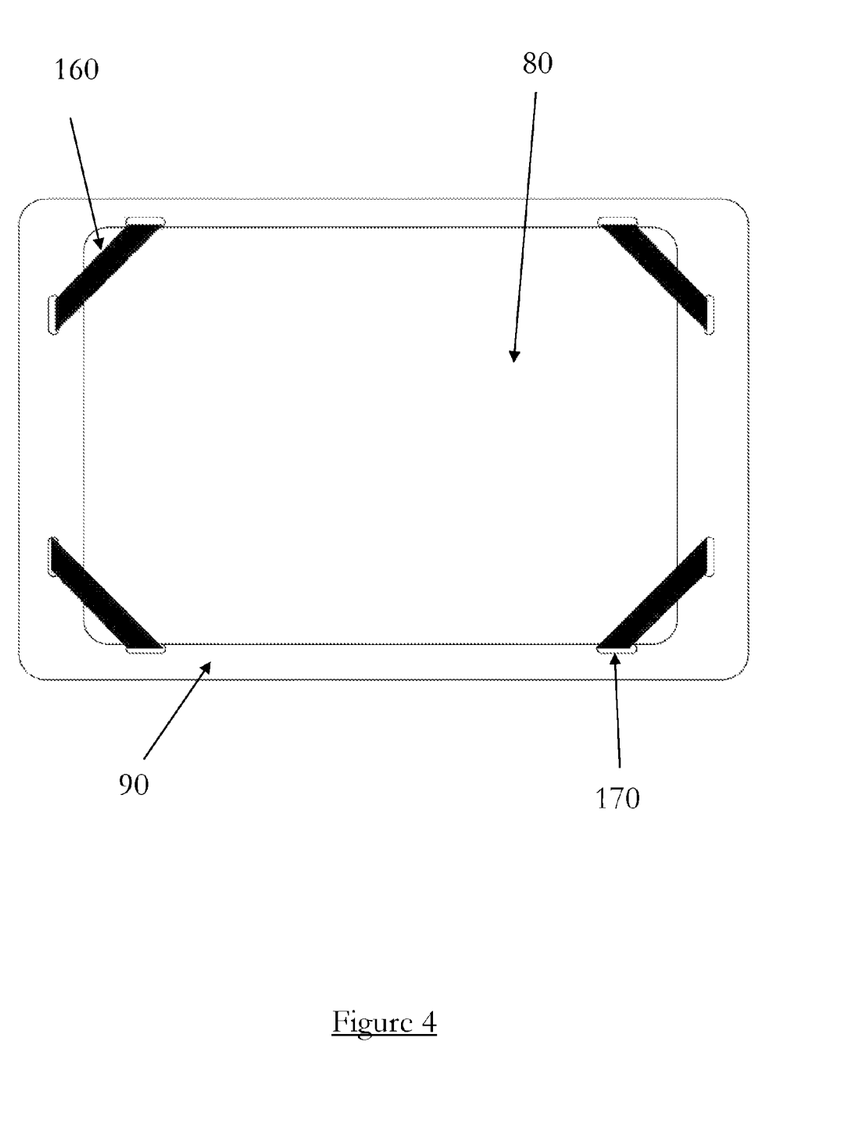
FIG. 4 is a plan view of a strap arrangement for holding a tablet computer.

FIG. 4 is a plan view of a strap arrangement for holding a tablet computer 80 on the retaining wall 90. This arrangement shows four straps 160 located at respective corners of the tablet 80, and passing diagonally thereover. The straps 160 are secured to an interior portion of the retaining wall, to improve the visual appearance of the case. In particular, the straps 160 pass through holes 170 in the exterior of the retaining wall 90.

Figure 5:
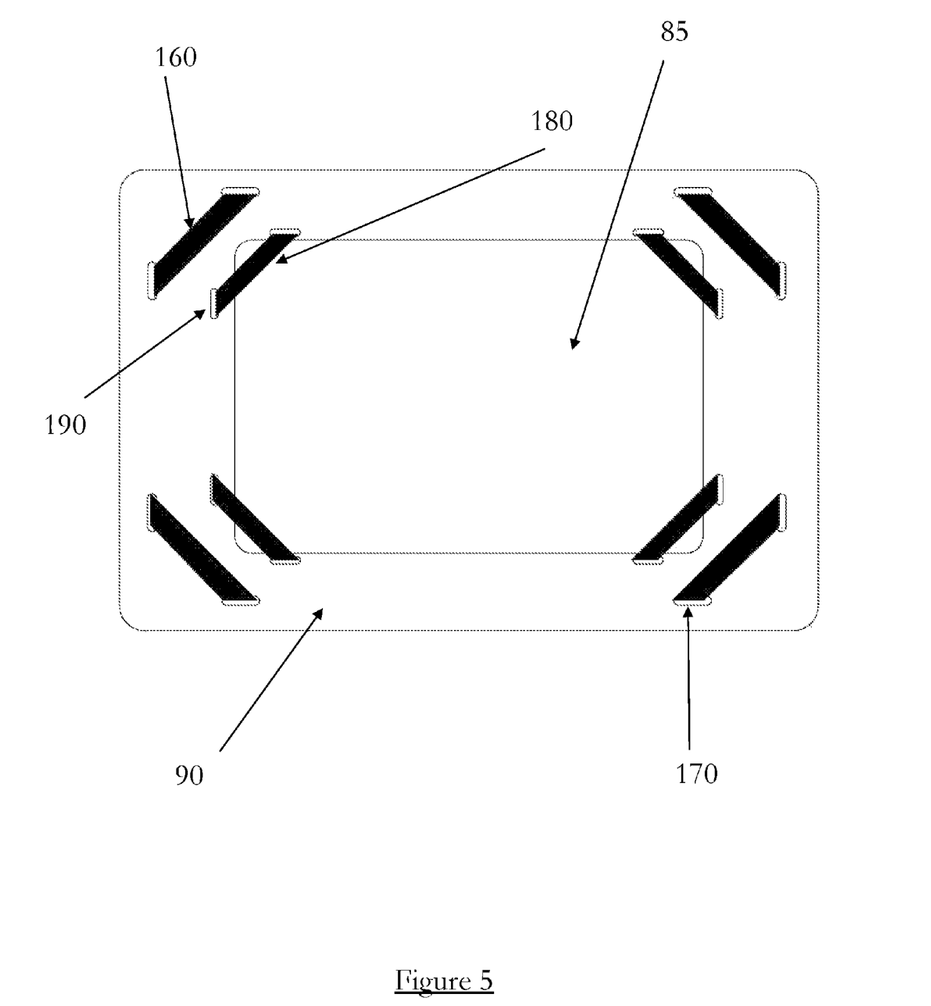
FIG. 5 is a plan view of the strap arrangement in FIG. 4, shown holding a smaller tablet computer to that shown in FIG. 4.

FIG. 5 is a plan view of the strap arrangement in FIG. 4, shown holding a smaller tablet computer 85 to that shown in FIG. 4. In addition to the straps 160 seen in FIG. 4, FIG. 5 shows four additional straps 180, and their respective holes 190, that work in a similar manner to the straps 160. The straps 180 and holes 190 are smaller than the straps 160 and holes 170, and are located closer to the centre of the retaining wall 90 for holding the smaller tablet 85.

The invention claimed is:

1. A portfolio case, comprising:
   a substantially rigid open-top box;
   a substantially rigid lid, pivotally coupled to the box by a hinge;
   a tablet retention mechanism located on an inside surface of the lid;
   wherein the hinge is configured to hold the lid in at least one rotational orientations relative to the box selected from a fully open position in which the tablet is operable by a user, and a partially open position, partway between the fully open position and a closed position in which operation of the tablet by a user is substantially inhibited;
   a fold-out keyboard pivotally attached to the box and movable between a first position in which the keyboard is retained within the box and a second position in which the keyboard extends out of the box away from the lid, the keyboard configured to be operably connectable to the tablet; and
   a power pack retained within the box configured to supply power to the keyboard and the tablet;
   wherein the keyboard and box are sized such that in the second position the keyboard slopes from the open top of the box toward a surface onto which the box is placed.

2. The portfolio case of claim 1, further comprising a processor configured to control signals between the tablet and the keyboard.

* * * * *